United States Patent [19]
Bates et al.

[11] 3,984,117
[45] Oct. 5, 1976

[54] LOCKING DEVICE FOR FREIGHT CARTS
[75] Inventors: James M. Bates; Gail F. DeVault; Edward L. Carlson, all of El Paso, Tex.
[73] Assignee: Magnolia Coca-Cola Bottling Company, El Paso, Tex.
[22] Filed: Mar. 17, 1975
[21] Appl. No.: 559,135

[52] U.S. Cl. .................... 280/179 R; 105/366 E
[51] Int. Cl.² ................................... B60P 7/00
[58] Field of Search ............ 280/179 R; 105/366 A, 105/366 E, 366 D, 366 C, 366 R, 463, 464, 465; 296/35 R, 35 A; 248/119 R

[56] References Cited
UNITED STATES PATENTS

| | | | |
|---|---|---|---|
| 2,351,314 | 6/1944 | Ario | 296/35 A |
| 2,950,126 | 8/1960 | Armentrout | 280/179 R |
| 3,210,038 | 10/1965 | Bader et al. | 280/179 R |
| 3,262,664 | 7/1966 | Paraskewik | 105/366 C |
| 3,892,436 | 7/1974 | Fathauer | 105/366 E |

Primary Examiner—Robert R. Song

[57] ABSTRACT

There is disclosed a locking device for securing a conventional freight cart within a vehicle such as a truck, train or trailer and which locking device includes a hook-like clasp member which is rotatably mounted relative to the vehicle structure, and a locking member that is operative to immobilize the clasp in the locked position thereof. A plurality of locking devices may be conveniently attached to or provided integrally with a side rail of the vehicle at spaced intervals corresponding to the size of the carts to be secured. Simple and quick engagement and disengagement of the locking devices facilitate efficient loading and unloading of the carts.

12 Claims, 8 Drawing Figures

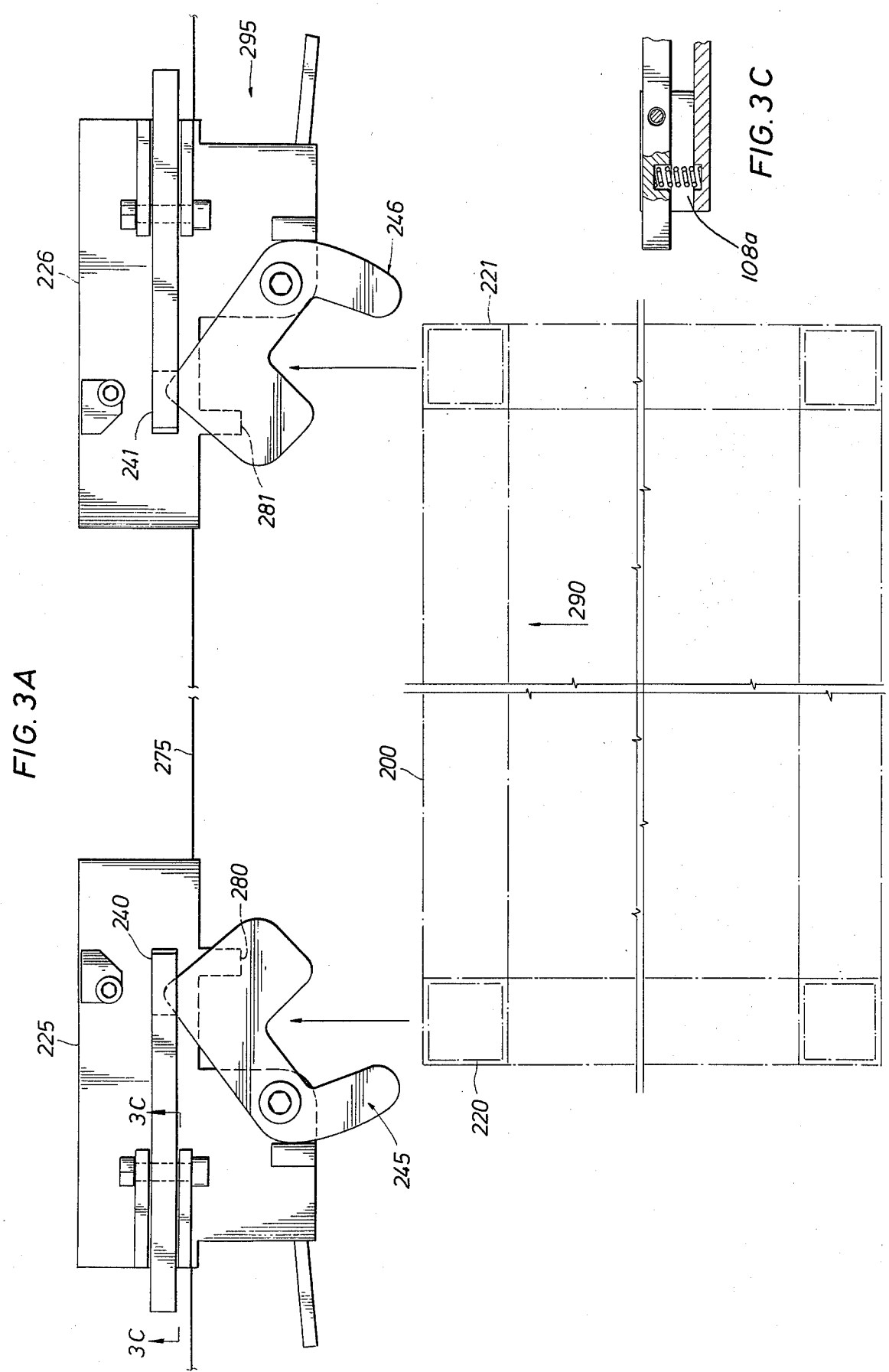

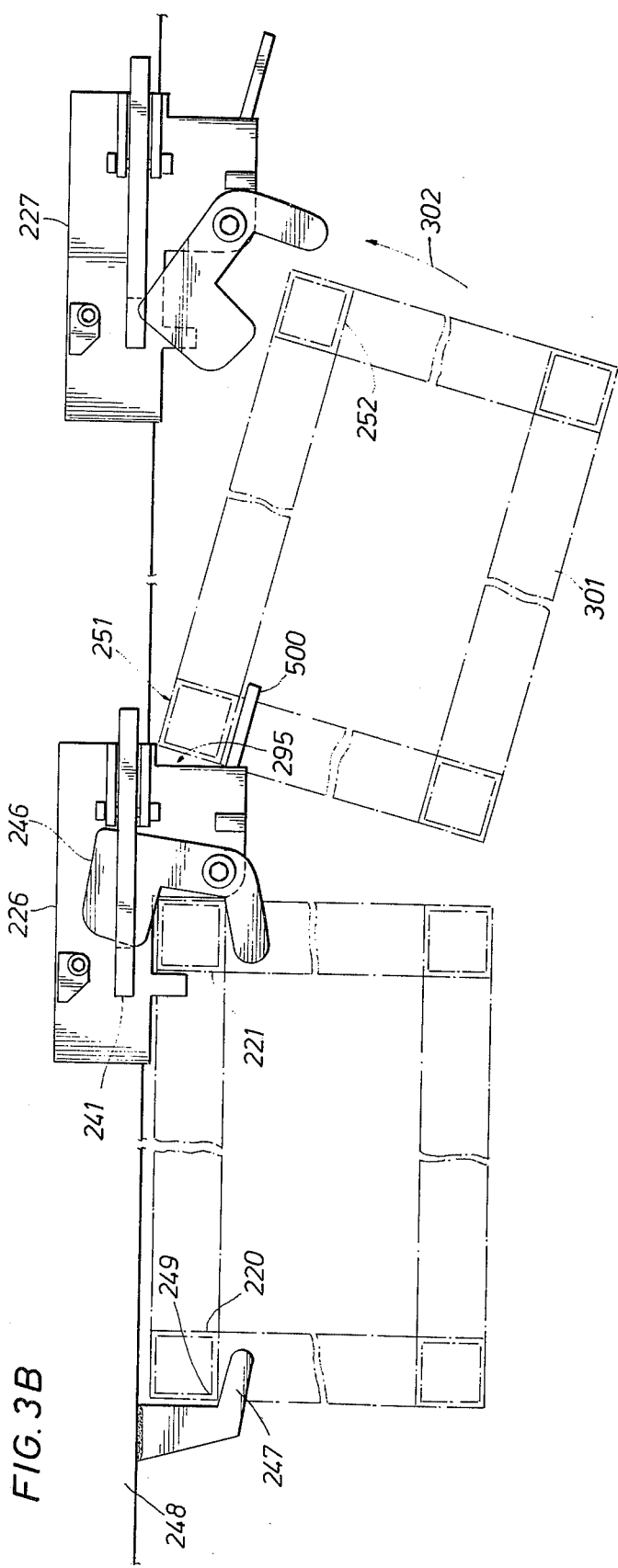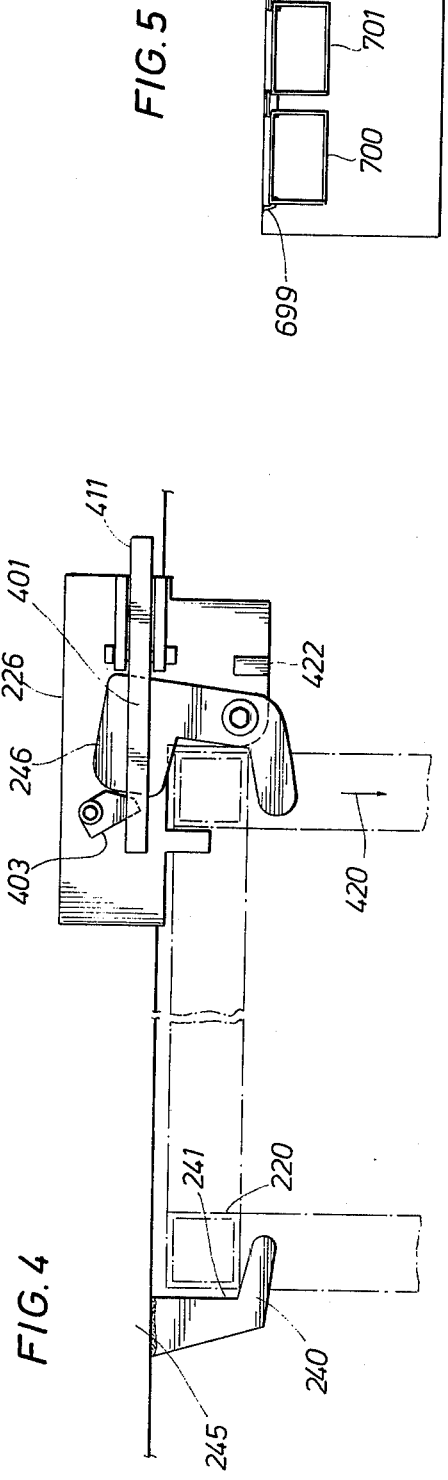

LOCKING DEVICE FOR FREIGHT CARTS

BACKGROUND OF THE INVENTION

1. Field of the Invention

The present invention relates to bulk freight handling systems, and more particularly, to a freight cart locking system including devices for securing freight carts within vehicles to prevent damage to the vehicle and the freight during bulk product shipping by trucks, trailers, or other vehicles.

2. Background of the Invention

The type of mobile bulk freight cart which may be secured in a truck or trailer with a locking device of the present invention has been utilized for several years for carrying freight and is shown in FIG. 2 of the accompanying drawings. These carts can be readily loaded at freight terminals and can be moved directly into an outgoing delivery truck or trailer. As the driver of the vehicle makes freight deliveries, the carts may be removed from the vehicle or may be gradually emptied, and the driver can segregate his pickups into the carts as he reloads the truck or trailer. The use of these carts has been found to greatly simplify the job of the freight operator and materially enhances the commercial competitiveness of the freight handling operation.

It is necessary to provide a means for securing these carts in the truck or trailer in which they are to be transported so that they will not shift while the truck is in transit. In U.S. Pat. No. 2,950,126 to Armentrout, a mobile bin is disclosed which provides a means for securing a cart of the type described above to the side rail of a truck or trailer. The mobile bin disclosed by Armentrout requires that the cart be modified before it can be used.

Other attempts to secure carts of the type described above have included the use of bushings attached to both the side rail of the vehicle and to the upright members of the cart which are to be secured to side rail. The difference in height of these bushings on the vehicle and on the cart to be secured are such that, when aligned, a pin may be inserted through both of them. The cart is, therefore, secured to a side rail mounted inside of the walls of the vehicle, but this type of locking device also requires modification to the cart to be secured.

Other locking devices for securing articles in vehicles during transit have focused on securing the bottom portion of the freight to be transported. For example, in U.S. Pat. No. 3,399,921 to Trost et al., a spring operated latching mechanism is disclosed for enabling a container to be secured to the bin of the truck or trailer. The utilization of the Trost latching mechanism requires that the container to be secured must be specially adapted to receive the latching mechanism.

The locking device of the present invention has the advantage of eliminating the necessity of modifying the cart before it can be secured in a vehicle.

SUMMARY OF THE INVENTION

It is a feature of the present invention to provide a locking device for securing an upright member of a cart to the side of a vehicle which requires no modification of conventional bulk freight handling carts. One suitable embodiment of the locking device of the present invention comprises a base member which is adaptable for attachment to a side rail that is, in turn, secured to the side of a vehicle and which has first and second ends. For purposes of simplicity, the side rail and base member may be considered as referring to the same or similar element. The base member includes a guide member in proximity to the first end of the base member, a base surface flange in proximity to the second end, and lock mounting flanges attached in spaced relationship in proximity to the second end of the base member. A generally U-shaped, hook-like clasp member is rotatably mounted to the base surface flange. This clasp member is used to secure the upright member of the cart in a closure formed between the clasp member, the base member, and the guide member when the device is in the locked position. A locking member is pivotally mounted between the lock mounting flanges and has a projecting portion which rests upon the clasp member when the clasp member is in the unlocked position. The projecting portion moves into place by gravity or is positively urged into place when the clasp member is rotated to the locked position. Further rotation of the clasp member is, therefore, prevented by the locking member when the clasp is in the locked position. Positive urging of the locking member into place allows the relative positions of the latch structures to be inverted for opposite sides of the vehicle.

A preferred embodiment of the locking device of the present invention may comprise an extension flange which is attached to the base surface flange to form a receptacle between it and the base member. This receptacle is suitable for inserting an upright member of a cart and is utilized to minimize the number of locking devices which must be present in the truck to secure all the carts.

Another embodiment of the locking device of the present invention may further comprise a rotation limitation flange which is mounted to the base surface flange to limit the rotation of the clasp member in the unlocked position.

Yet another embodiment of the locking device of the present invention may additionally be provided with a lock disable member which is rotatably mounted to said base member and which may be used to disable the gravity lock member. This lock disable feature provides for rapid unlocking of the embodiment of the present invention.

In the preferred embodiment of the locking device of this invention, a base member having two ends is provided which is made of angle iron. A flange extends from one face of the angle iron as a guide member in near proximity to one end and a base surface flange extends from the same face in proximity to the second end to increase the surface area of the adjacent face. A generally U-shaped, hook-like clasp member is rotatably mounted to the base surface flange, and it secures the upright member of the cart in the closure formed between the clasp member, the base member, and guide member when the locking device is in the locked position. A rotation limitation flange is attached to the base surface flange to limit the rotation of the hook-like clasp member in the unlocked position. Lock mounting flanges are attached to the angle iron base member in proximity to the second end in spaced relation to each other, and one end of a locking member is then pivotally mounted between the lock mounting flanges. The other end of the locking member has a pawl which rests upon the clasp member when it is in the unlocked position, and the pawl moves into the engagement with the base member when the clasp is rotated to the locked position. The locking member prevents further rotation of the clasp member in the locked position.

Other advantages and features of the locking device of the present invention will become apparent from the drawings and the detailed description of a presently preferred embodiment which follows.

BRIEF DESCRIPTION OF DRAWINGS

In the accompanying drawings:

FIG. 1b is a top view of an embodiment of the present invention which is the mirror image of the embodiment shown in FIG. 1a.

FIGS. 3a and 3b are top views illustrating various ways of securing freight carts in accordance with the present invention showing the unlocked and locked positions of the locking device, respectively;

FIG. 3c is a cross-sectional view taken along line 3c — 3c of FIG. 3a.

FIG. 4 is a top view of the operation of an embodiment of this invention during a portion of the unlocking operation; and FIG. 5 is a top view of a truck which shows the manner in which embodiments of the locking device of the present invention may be spaced along side rails that are attached to the walls of a vehicle.

DESCRIPTION OF THE PREFERRED EMBODIMENTS

It will be appreciated that the present invention can take many forms and embodiments. It is not intended that the embodiments of the invention presented herein should in any way limit the true scope of the invention.

Figure 1A:
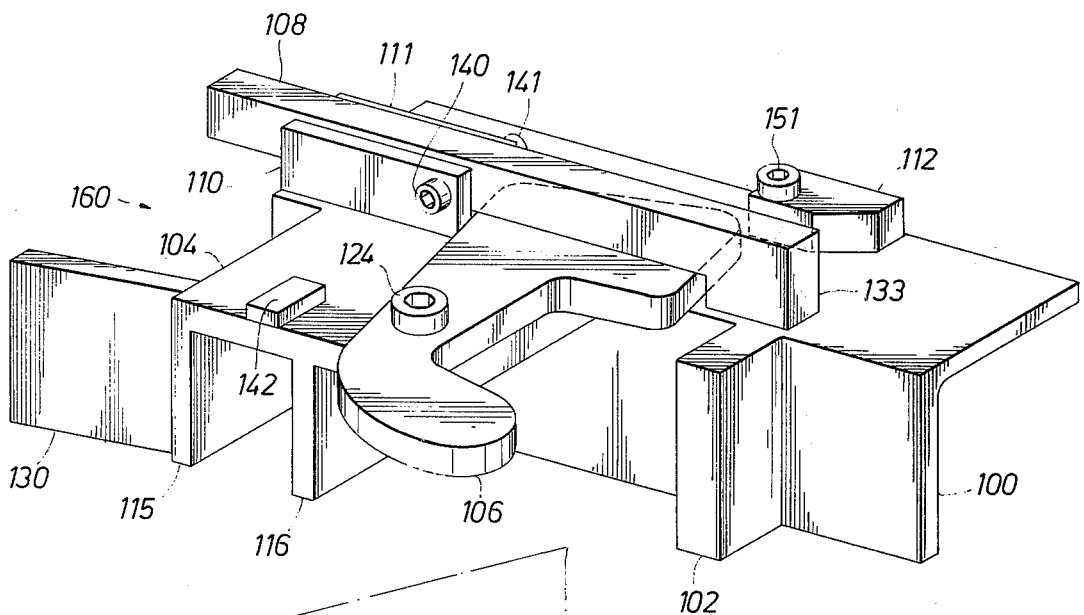
FIG. 1a is isometric projection of a preferred embodiment of the locking device of this invention.

With reference now to FIG. 1a, an embodiment of the locking device of the present invention comprises base member 100 that may be a rather short element to be secured to a structural element of the vehicle or, in the alternative, may comprise a rail that may extend the entire length of the vehicle. The locking device may further include a retainer and guide member 102, a base surface flange 104, hook-like clasp member 106, a gravity lock member 108, lock mounting flanges 110 and 111, and support members 115 and 116.

Base member 100 is preferably fabricated from 3/16 inch angle iron and, is, in an embodiment of this invention, 7inches, more or less, in length. In the alternative, the base member could extend the entire length of the vehicle and the various components of the locking mechanism may be connected thereto in any suitable manner. For purposes of simplicity, the invention will be discussed in conjunction with the short base member.

Guide and retainer member 102 is a flange to base member 100, may be fabricated from ½ inch steel plate, and may be attached to base member 100 by suitable means, e.g. by welding. The guide and retainer member guides the cart into proper position therewith and restrains the cart against movement during transit.

Base member flange 104 is a flange to base member 100 and is used to increase the surface area of one face of base member 100. Base surface flange 104 may be fabricated from ½ inch steel plate and may be attached to base member 100 by suitable means, e.g. by welding. A hole (not shown) is drilled in base surface flange 104 and may be threaded to engage the threaded portion of shoulder bolt 124. A nut may be received by the bolt 124 to positively secure the bolt in place Flanges 115 and 116 are supports for base surface flange 104 and are attached to both base member 100 and to base surface flange 104 by suitable means, e.g. by welding. Flanges 115 and 116 may be preferably fabricated from ¼ inch steel plate.

Hook-like clasp member 106 is generally "U-shaped" and may be fabricated from ½ inch steel plate. A hole (not shown) is drilled therein to accept the shoulder portion of a shoulder bolt 124. Clasp member 106 may be rotatably mounted to base surface flange 104 with shoulder bolt 124 and a nut (not shown).

Lock mounting flanges 110 and 111 are each similar in construction and may be fabricated from ¼ inch steel plate with holes (not shown) drilled therein. Lock mounting flanges 110 and 111 are attached to base member 100 in spaced relationship to each other by some suitable means, e.g., by welding.

Lock member 108 may also be fabricated from ½ inch steel plate. It has two ends and is generally "L-shaped" with a pawl 133 on the first end and with a hole (not shown) drilled near the second end. The second end is pivotally mounted between lock mounting flanges 110 and 111 by aligning the hole in gravity lock member 108 and lock mounting flanges 110 and 111 and by inserting shoulder bolt 140 through them. Nut 141 secures shoulder bolt 140 into place. A lock nut may be employed to secure the bolt in place while allowing free pivoting of the locking member.

As illustrated in FIG. 3c, the lock member may be urged to the locking position thereof by a compression spring 108a, received within appropriate spring recesses. This feature allows the locking mechanism to be utilized in a position that is inverted with respect to the position thereof shown in FIG. 1a.

An additional embodiment of the locking device of the present invention may comprise rotation limitation flange 142 as shown in FIG. 1a. Rotation limitation flange 142 is preferably fabricated from 3/16 inch steel plate and is attached to base surface flange 104 by suitable means, e.g. by welding. Rotation limitation flange 142 limits the rotation of clasp 106 in the unlocked position.

An additional embodiment of the locking device of the present invention may comprise lock disable member 112 as shown in FIG. 1a. Lock disable member 112 is preferably fabricated as shown from ½ inch steel plate. A hole (not shown) is drilled therein so that lock disable member 112 may be rotatably mounted on bolt 151 which is attached to base member 100. A nut, not shown, may be employed to secure lock disable member 112 to bolt 151.

The preferred embodiment of the locking device of the present invention may include the provision of an extension flange 130 as shown in FIG. 1a. Extension flange 130 is attached to base surface flange 104 and to support flange 116 by suitable means, e.g., by welding. A receptacle 160 is thereby defined between extension flange 130 and base member 100 which serves to confine one portion of a freight cart and prevent movement thereof during transit while the clasp portion of the locking device retains one portion of an adjacent freight cart.

Figure 1B:
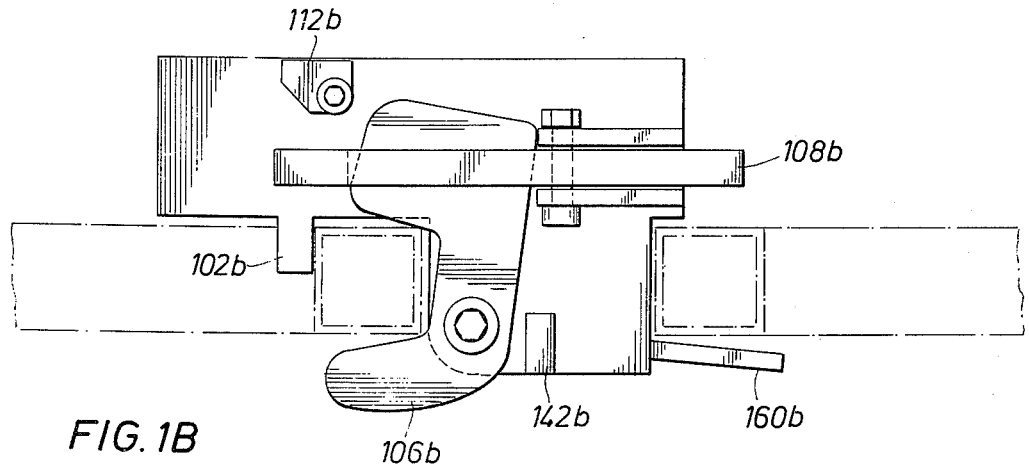

Referring still to FIG. 1a, a preferred embodiment of the locking device of the present invention comprises all the elements heretofore recited. With reference to FIG. 1b, an embodiment of the locking device of the present invention is shown which is the mirror image of the embodiment shown in FIG. 1a, each similar reference character being indicated by a suffix b. Since a primary purpose of the locking device of the present invention is to secure the upright member of a cart to the side rail of a truck, the preferred embodiment of the invention shown in FIG. 1a will generally be used to secure carts to the driver side of the truck, while the embodiment of the invention shown in FIG. 1b will generally be used to secure carts to the curb side of the truck.

It should be apparent that the component parts of the locking device of the present invention could be fabricated using molding techniques. Furthermore, base member 100, guide member 102, base surface flange 104, locking mounting flanges 110 and 111, and support members 115 and 116 could be moulded as one part using these techniques. Molding these parts as one piece would be especially desirable in instances where it is desired that the locking device be constructed, for example, of a durable plastic. When the molding is complete, the aforementioned holes could be drilled in the necessary locations, and the devices could be assembled.

Figure 2:
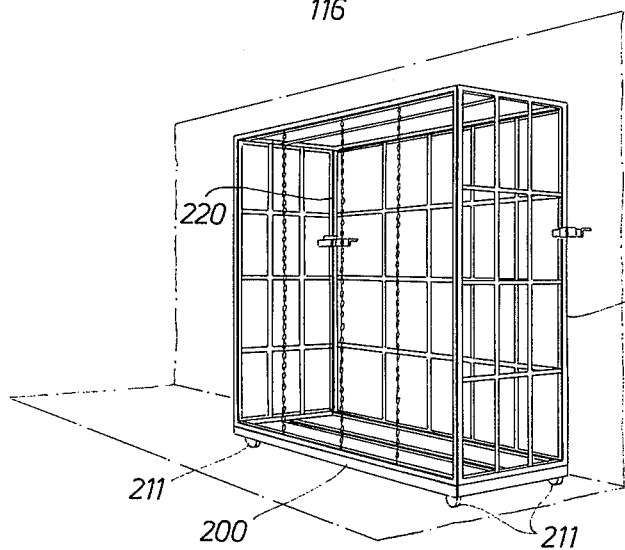
FIG. 2 is an isometric projection of the type of cart which may be secured to a side rail mounted within a truck with the loading device of this invention.

Referring now to FIG. 2, there is shown a cart 200 which may be secured to the side rail of a truck with the locking device of the present invention. This type of cart may be utilized to carry freight, e.g., cases of soft drink bottles. The corner upright member 220 and 221 of cart 200 are secured to side rail of truck with the locking device of the present invention as explained below. Wheels 211 are mounted on the bottom of the cart to facilitate the movement of the cart. Two of the wheels at one end of the cart will generally be immovable about a vertical axis while the two wheels at the opposite extremity of the cart will be caster type wheels, capable of revolving about a vertical axis for steering of the cart.

With references now to FIG. 3a, there is shown a manner in which two locking devices representing preferred embodiments of the locking device of the present invention may be utilize to secure the upright members 220 and 221 of cart 200 to the side rails of a truck 275. Two locking devices 225 and 226 are first securely fastened in spaced relationship to a side rail that is secured within the truck 275, and this fastening may be accomplished by any suitable means, e.g., by welding. The spacing of locking devices 225 and 226 corresponds to the distance between upright members 220 and 221 of cart 200. Locking devices 225 and 226 may then be placed in the open positions thereof, i.e., the hook-like clasp members 245 and 246 each being rotated to the open position as shown in FIG. 3a. Locking members 240 and 241 rest upon clasp members 245 and 246 in this open position. The inner surface of the upright members 220 and 221 of cart 200 may then be aligned with the inner surfaces of the guide members 280 and 281. A force, indicated by arrow 290, is then exerted on the cart to cause it to be pushed toward the side of truck 275. The hook-like clasp members 245 and 246 rotate under the influence of the force to the locked position shown at the center portion of FIG. 3b. Each upright members 220 and 221 of the cart 200 and thereby secured in the closure formed between the respective hook-like member, the respective guide member, and the respective base member.

As mentioned above, the pawls of locking members 240 and 241 rest upon the hook-like clasp members 245 and 246, respectively, when the locking devices 225 and 226 are in the open position shown in FIG. 3a. When the clasp member 246 is rotated under the influence of force indicated by arrow 290, the projecting portion 13 of the locking member 241 is able to move into place. In the preferred embodiment of the invention, the projecting portion of the locking member moves from the hook-like clasp member 246 to the base member as shown at the center portion of FIG. 3b. The clasp member 246 is then in the locked position and is unable to rotate.

The forwardmost cart restraining element on each side of the vehicle will simply comprise a generally L-shaped restraining element 247 that may be fixed by any suitable means of connection, i.e., welding, to the base member 248 whether the base member be a short angle element as shown in FIG. 1a or a long angle element extending the entire length of the vehicle. When the first freight cart is installed into the vehicle, it, with the caster wheels trailing the front wheels, will be moved at an angle to the side wall of the vehicle with the forward corner post moving into the recess 249 defined by the cooperative relation of the restraining element 247 and the base element. The restraining element, being fixed, will stop the cart when the forward corner post 220 has moved fully into the recess 249, positioning the cart for the latching movement.

By virtue of the steering casters at the rear of the freight cart, the cart will be accurately rotated about the pivot point defined by engagement between the corner post 220 and the restraining element 240, causing the rear corner post 221 to be received by the locking element 226 and restrained by the clasp member 246. This feature eliminates the need for a complete locking device at the forward sides of the vehicle.

With reference still to FIG. 3b, an upright member 251 of the next cart 301 to be secured to the side rail of the truck may be inserted into the receptacle 295 formed by extension 500 and base member. The other upright member 252 of cart 301 may then be secured by locking device 227 when cart 301 is rotated to engage locking device by the force indicated by arrow 302.

The unlocking operation of an embodiment of the locking device of the present invention is presented with reference to FIGS. 3a and 4. In FIG. 4, downward directed pivoting forces indicated are applied to locking member 401 at the point indicated at 411. Locking member 401 pivot so that the projecting portion thereof is raised above the clasp member 246. Lock disable member 403 is then rotated into contact with clasp 246 as also shown in FIG. 4. The pivoting force is then removed, and the projecting portion of the locking member 401 drops to and rests upon lock disable member 403. When an outward force indicated by arrow 420 is applied to the cart, the rear portion of the cart moves arcuately away from the side rail of the truck 275, pivoting the cart about the vertical post 220, because clasp 246 is able to rotate to the open or unlocked position as shown in FIG. 3a. The squared off portion of lock disable member 403 then rests upon the clasp and lock disable member 403 and rotate generally to the position also shown in FIG. 3. Rotation limitation flange 422 limits the rotation of the clasp 246 in the unlocked direction. The cart is no longer secured by the locking devices and may be moved to any convenient location.

With reference again to FIGS. 1a and 1b, the inclusion of extension flange 130 in a preferred embodiment of the locking device of this invention reduces the number of locking devices that are required to secure a plurality of carts along each side rail of the truck. With reference to FIG. 5, only one locking device is required to secure the first cart 700 because the forward end of the first cart is secured by the retainer element 699, shown at 240 in FIG. 4. Only one locking device is required, however, to secure each additional cart 701 and 702, because one upright of each may be inserted into the receptacle 160 formed between extension flange 130 and the base member 100 (FIGS. 1a and 1b).

What is claimed is:

1. A locking device for securing an upright member of a freight cart within a vehicle which comprises:
   a base member which is adaptable for attachment to the structure of the vehicle;
   a restraining member being provided on said base member;
   lock mounting means being provided on said base member;
   a clasp member being rotatably mounted to the base member and securing a structural member of the cart in a closure formed between the clasp member, the base member, and the restraining member when the locking device is in the locked position; and
   a gravity lock member which is pivotally mounted to said lock mounting means, the lock member having a projection which rests upon the clasp member when the locking device is in the unlocked position and which falls into place when the clasp member is rotated to the locked position and holds the clasp member in the locked position.

2. A locking device for securing an upright member of a cart to the side of a vehicle which comprises:
   a base member having a flat surface area and having first and second ends, the base member being adapted for attachment to the side rail;
   a base surface flange which is attached in proximity to the first end of the base member to increase the surface area of the base member;
   a guide member attached as a flange to the base member in near proximity to the second end;
   a clasp member which is rotatably mounted to the base surface flange and which secures the upright member of the cart in a closure formed between the clasp member, the base member, and the guide member when the locking device is in the locked position;
   lock mounting flanges which are attached in spaced relationship in near proximity to the second end of the base member; and
   a gravity lock member which is pivotally mounted between the spaced lock mounting flanges, which rests upon the clasp member when the locking device is in the unlocked position and which falls into place by gravity when the clasp member is rotated to the locked position and holds the clasp member in the locked position.

3. The locking device of claim 2, further comprising an extension which is attached as a flange to the base surface flange to define a receptacle between the extension and the base member suitable for inserting an upright member of a cart.

4. The locking device of claim 2 further comprising a rotation limitation flange which is attached to the base surface flange to limit the rotation of the clasp member in the unlocked position.

5. The locking device of claim 2 further comprising a lock disable member which is rotatably mounted on the base member and which may be used to disable the gravity lock member when the locking device is in the locked position.

6. A locking device for securing an upright member of a cart to the side of a vehicle which comprises:
   a base member made of angle iron having first and second ends;
   a guide member attached as a flange to one face of the base member in proximity to the second end;
   a base surface flange which is attached to the same face as the guide member in proximity to the first end of the base member to increase the surface area of the face of the base member;
   a hook-like clasp member which is rotatably mounted to the base surface flange and which is used to secure the upright member of the cart in a closure formed between the clasp member, the base member, and the guide member when the locking device is in the locked position;
   lock mounting flanges attached in spaced relationship in proximity to the second end of the base member;
   a gravity lock member of generally L-shape which is pivotally mounted between the spaced lock mounting flanges, the gravity lock member having a pawl which rests upon the clasp member when the locking device is in the unlocked position, and which drops from the clasp member to the base member to prevent rotation of the clasp member when the clasp member is rotated to the locked position;
   a rotation limitation flange which is attached to the base surface flange to limit the rotation of the clasp member in the unlocked position;
   a lock disable member which is rotatably mounted to the base member and which may be used to disable the gravity lock member when the locking device is in the locked position; and
   an extension flange which is attached to the base surface flange thereby defining a receptacle between the extension and the base member suitable for inserting an upright member of a cart.

7. Means for immobilizing freight carts within a vehicle defining support walls, said freight carts being defined at least in part by a structural framework, said immobilizing means comprising:
   elongated structural support means being secured to said support walls of said vehicle;
   means defining a receptacle being generally fixed in relation to said structural framework, said receptacle being adapted to receive a first part of said structural framework therein;
   clasp means being disposed in pivotal relation to said elongated structural support means and being pivotally movable between locked and unlocked positions, said clasp means, in the unlocked position thereof, defining a receiver for a second part of said structural framework and being pivoted to the locked position thereof by a second part of said structural framework upon movement of said cart to the immobilized position thereof in said vehicle, said clasp means, upon reaching said locked position thereof, establishing interlocking relation with said second part of said structural framework;

lock means being supported in movable relation to said receptacle defining means and being movable between locking and unlocking relation with said clasp means, said lock means being moved to said locked position thereof by said freight cart upon movement of said cart to said immobilized position and being manually moved to the unlocked position thereof to allow movement of said cart from said immobilized position.

8. Means for immobilizing freight carts as recited in claim 7, wherein said means defining a receptacle comprises;

a hook-like element being disposed in generally fixed relation to said elongated structural support means and cooperating with said elongated structural support means to define a receptacle for receiving and retaining a part of said structural framework of said cart, said hook-like element being disposed in spaced relation to said clasp means.

9. Means for immobilizing freight carts as recited in claim 7, wherein said elongated structural support means includes:

retainer means extending from said structural support means and cooperating with said clasp means in the locked position of said clasp means to define a latching receptacle within which is received said second part of said structural framework of said cart.

10. Means for immobilizing freight carts as recited in claim 7, wherein said elongated structural support means includes:

a pair of lock supports flanges extending from said elongated structural support means, said lock means being pivotally secured between said lock support flanges.

11. Means for immobilizing freight carts as recited in claim 7, wherein:

said lock means is a gravity lock element and is moved from the unlocked position thereof to the locked position under the influence of gravity after said clasp has moved to the locked position thereof.

12. Means for immobilizing freight carts as recited in claim 7, wherein:

urging means is disposed in engagement with said lock means and urges said lock means toward the locked position thereof.

* * * * *